(12) United States Patent
Peker et al.

(10) Patent No.: US 9,374,452 B2
(45) Date of Patent: Jun. 21, 2016

(54) APPARATUS AND METHOD FOR DETECTION OF OFF-HOOK PHONE IN REVERSE POWER FEEDING ARCHITECTURE

(71) Applicant: Microsemi Corporation, Aliso Viejo, CA (US)

(72) Inventors: Arkadiy Peker, Glen Cove, NY (US); Daniel Feldman, San Jose, CA (US); Shahar Feldman, Irvine, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 0 days.

(21) Appl. No.: 14/710,611

(22) Filed: May 13, 2015

(65) Prior Publication Data

US 2015/0334226 A1   Nov. 19, 2015

Related U.S. Application Data

(60) Provisional application No. 61/994,243, filed on May 16, 2014.

(51) Int. Cl.
*H04M 1/24* (2006.01)
*H04M 3/08* (2006.01)
(Continued)

(52) U.S. Cl.
CPC ............... *H04M 3/14* (2013.01); *H04M 3/306* (2013.01); *H04M 19/02* (2013.01); *H04M 19/08* (2013.01)

(58) Field of Classification Search
CPC ......... H04M 1/728; H04M 1/74; H04M 1/82; H04M 3/22; H04M 11/006; H04M 19/001; H04M 19/08; H01R 13/7032; H01R 4/2433; H01R 24/62; H01R 2201/16; C08J 2003/14; C08J 2003/142; C08J 2003/18; C08J 2375/04; C08J 9/144
USPC .............. 379/1.01, 1.03, 29.03, 29.04, 29.07, 379/29.08, 30, 413
See application file for complete search history.

(56) References Cited

U.S. PATENT DOCUMENTS 5,640,451 A * 6/1997 Schopfer ............... H04M 1/745
379/377
5,802,170 A * 9/1998 Smith ................... H01R 4/2433
361/119

(Continued)

OTHER PUBLICATIONS

International Search Report for PCT/US2015/030441 issued by European Patent Office Jul. 17, 2015.

(Continued)

*Primary Examiner* — Binh Tieu
(74) *Attorney, Agent, or Firm* — Simon Kahn (57) ABSTRACT

A powering arrangement for use with reverse power feeding arranged to detect an improperly connected POTS phone going off-hook by: measuring a first current flow from a power sourcing equipment; identifying a rapid first increase in current flow from the measured first current flow, the rapid increase defined as a rate of change greater than a predetermined minimum rate of change; identifying a second increase in current flow from the measured first current flow, the identified second increase greater than a predetermined minimum amount; confirming that the identified second increase in current flow is maintained for at least a predetermined amount of time beginning with the identified first increase in current flow; and outputting an error signal to the power sourcing equipment in the event of the identified condition.

11 Claims, 6 Drawing Sheets

(51) Int. Cl.
*H04M 3/22* (2006.01)
*H04M 1/00* (2006.01)
*H04M 3/14* (2006.01)
*H04M 19/02* (2006.01)
*H04M 3/30* (2006.01)
*H04M 19/08* (2006.01)

(56) References Cited

U.S. PATENT DOCUMENTS

| | | | | |
|---|---|---|---|---|
| 6,157,716 A * | 12/2000 | Ortel | ............... | H04M 19/001 379/413 |
| 2007/0116256 A1 * | 5/2007 | Ponganis | ............ | H04M 11/066 379/413 |
| 2010/0007334 A1 | 1/2010 | Apfel | | |
| 2011/0064212 A1 * | 3/2011 | Cooper | ............... | H04M 19/08 379/307 |
| 2013/0251114 A1 * | 9/2013 | Humphrey | ............ | H04M 1/738 379/30 |

OTHER PUBLICATIONS

Written Opinion of the International Searching Authority for PCT/US2015/030441 issued by European Patent Office Jul. 17, 2015.

Adtran Europe Limited; "An Enhancement for Combining RPF and POTS"; published by ETSI, TS 101 548 RPF; Submission Date Mar. 14, 2014.

* cited by examiner

PRIOR ART

APPARATUS AND METHOD FOR DETECTION OF OFF-HOOK PHONE IN REVERSE POWER FEEDING ARCHITECTURE

CROSS-REFERENCE TO RELATED APPLICATIONS

This application claims priority from U.S. Provisional Application Ser. No. 61/994,243 filed May 16, 2014, entitled "Method of Identification of Off-Hook Phones in Reverse Power Feeding (RPF) Architecture", the entire contents of which is incorporated herein by reference.

TECHNICAL FIELD

The invention relates generally to the field of reverse power feeding and particularly to an apparatus and method of detecting the appearance of a POTS phone improperly connected in customer premises equipment.

BACKGROUND

Various communication standards, such as digital subscriber line (xDSL), very-high-bit-rate digital subscriber line 2 (VDSL2), G.hn, and G.fast, have been proposed or developed to provide high-speed data transmission from the service provider (e.g., a central office) to a customer premise over the existing twisted-pair copper wiring conventionally used for telephone service. Such technologies leverage modem technology to increase the data transfer bandwidth of the twisted-pair copper wiring. Typically, modems are provided on the ends of the subscriber line copper wiring to communicate between the central office and the customer premise. The manner in which the two modems communicate is established by the particular standard governing the communication. Because the existing telephone wire is used, the data signals are typically transferred out-of band with the voice band signals. Because different frequencies are used for the voice band and the data band, voice and data information can be concurrently transferred over the twisted-pair copper line.

Service providers have increased data bandwidth by installing fiber optic cabling between the central office (CO) and a distribution point unit (DPU) closer to the customers. A particular DPU may interface with a bundle of twisted pairs to service a relatively small number of customer premise connections. This approach shortens the length of the copper pair between the CO interface at the DPU and the customer, thereby allowing increased data rates. Thus the DPU will provided telephony and/or data to one or more customer premises equipment (CPE)

One difficulty arising from an optical connection between the central office and the DPU lies in the inability to provide a source of power for the DPU. Due to the remoteness of the DPU with respect to the central office, a local power supply is often unavailable or expensive to install.

Powering for a DPU may be provided by reverse power feeding, wherein power is supplied to the DPU from the various CPEs for which telephony and/or data services are provided from the DPU. A standard for reverse power feeding is being standardized by ETSI and the Broadband World Forum. In such an embodiment, a power supply in the DPU may combine power contributions from multiple CPEs to power a main distribution unit (MDU) that handles the voice and data communication. This arrangement is referred to as a reverse power system, since the CPEs are the power sourcing equipment (PSE) and the DPU, particularly the MDU, is the powered device (PD).

Figure 1:
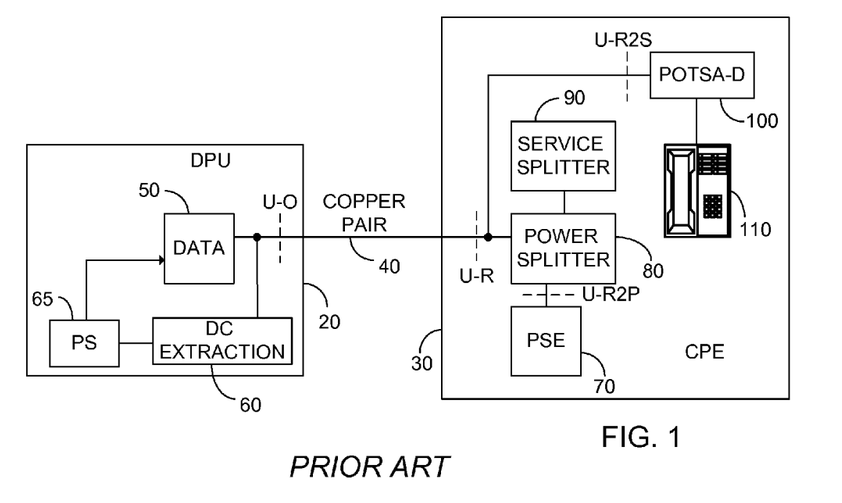
FIG. 1 illustrates a high level block diagram of a reverse power feeding arrangement according to the prior art, with a telephone connected through a POTS adapter.

The CPE PSE thus injects power across the copper pair. In order to use a plain old telephony service (POTS) type analog telephone, a POTS adapter is to be installed between the copper pair and the POTS telephone. FIG. 1 illustrates a high level block diagram of such an arrangement, comprising a DPU 20 and a CPE 30 connected by a copper pair 40, with certain standard ETSI symbols shown. DPU 20 comprise a data provision module 50, typically in optical communication with a CO; a DC extraction circuitry 60; and a distribution point power supply 65. Data provision module 50 and DC extraction circuitry 60 are each connected to copper pair 40 past the U-O reference point. The U-O reference point is defined as the reference point at the DPU containing both DC power and service data. Distribution point power supply 65 is arranged to convert power received from DC extraction circuitry 60 to an appropriate power for data provision module 50, and other devices located within DPU 20.

CPE 30 comprises a PSE 70, a power splitter 80, a service splitter 90, a POTSA-D adaptor 100 and a POTS telephone 110. PSE 70 is connected to power splitter 80 across the U-R2P reference point, defined as the reference point at CPE 30 containing the injected DC power. Power splitter 80 is connected to service splitter 90, which provides service and optionally analog phone service for CPE 30. Power splitter 80 is additionally connected to copper pair 40 across the U-R reference point, defined as the reference point at CPE 30 containing both DC power and service data. POTSA-D 100 is connected to copper pair 40 between power splitter 80 and the U-R reference point. POTSA-D 100 is an adapter that can be attached to one or more POTS telephone 110 in CPE 30. POTSA-D 100 is arranged to perform the following functions: translate the signals from the upstream DC and low frequency POTS signaling from the POTS telephone 110 into an in-band or out-of-band signaling system; translate the signals from the downstream in-band or out-of-band signaling system into POTS signaling towards the POTS telephone 110; and provide sufficient current, with a current limit, and DC voltage to supply POTS telephone 110.

In the event that POTS telephone 110 is mistakenly connected to the reverse power feeding network without POTSA-D 100, i.e. POTS telephone 110 is mistakenly connected directly to the in-premises wiring at the potential of reference point U-R, when POTS telephone 110 goes off-hook it draws a large current from PSE 70. A standard POTS telephone 110 assumes that the CO supplies a current limited power, and thus is not designed with an inherent current limiter. As indicated above, one of the functions of POTSA-D 100 is thus to limit the current, however in the absence of POTSA-D 100, POTS telephone 110 may draw very large amounts of current from PSE 70, which may result in an unsafe condition, such as a fire.

An additional issue is one of identification by PSE 70 of the proper conditions over which to supply power. It is presently contemplated by the inventors that PSE 70 should provide for detection of DC extraction circuitry 60 prior to supplying power. As such, it is required that POTSA-D 100, which ultimately may also draw power from PSE 70, not interfere with such a detection process.

SUMMARY OF THE INVENTION

Accordingly, it is a principal object of the present invention to overcome at least some of the disadvantages of prior art reverse power systems. This is accomplished in one embodiment by a powering arrangement for use with reverse power feeding, the powering arrangement comprising: a control circuit; a power sourcing equipment, the power sourcing equipment responsive to the control circuit; and a current sensing circuit arranged to detect the amount of current provided by the power sourcing equipment, the control circuit in communication with the current sensing circuit, the control circuit arranged to: measure a first current flow from the power sourcing equipment; identify a rapid first increase in current flow from the measured first current flow, the rapid increase defined as a rate of change greater than a predetermined minimum rate of change; identify a second increase in current flow from the measured first current flow, the identified second increase greater than a predetermined minimum amount; confirm that the identified second increase in current flow is maintained for at least a predetermined amount of time beginning with the identified first increase in current flow; and output an error signal to the power sourcing equipment in the event of the identified rapid increase in current flow, the identified second increase in current flow and the confirmation that the identified second increase in current flow is maintained for at least the predetermined amount of time.

In one further embodiment, the power sourcing equipment is arranged to shut down responsive to the output error signal. In another further embodiment, the power sourcing equipment is provided with a first current limit and second current limit lower than the first current limit, wherein responsive to the output error signal the power sourcing equipment is arranged to change the current limit from the first current limit to the second current limit.

In one further embodiment, the current sensing circuit comprises a current minor. In another further embodiment, the powering arrangement further comprises: a DC extraction circuitry; and a distribution point power supply, the DC extraction circuitry coupled over a copper wire pair to the power sourcing equipment, the DC extraction circuitry arranged to feed an extracted power to the distribution point power supply, the distribution point power supply having a predetermined bandwidth such that a change in current drawn by the distribution point power supply over time is less than the predetermined rate of change. Optionally, the power sourcing equipment is arranged to detect a predetermined signature resistance presented by the DC extraction circuitry, the power arrangement further comprising: a plain old telephony service (POTS) adapter coupled to the power sourcing equipment, the POTS adapter comprising an under voltage lockout (UVLO) circuit and an electronically controlled switch responsive to the output of the UVLO circuit, the electronically controlled switch arranged to prevent the appearance of a parallel resistance from the POTS adapter from appearing to the power sourcing equipment in parallel to the predetermined signature resistance until a voltage in excess of a predetermined minimum value is detected by the UVLO circuit.

Independently, a method of powering for use with reverse power feeding is enabled, the method comprising: measuring a first current flow from a power sourcing equipment; identifying a rapid first increase in current flow from the measured first current flow, the rapid increase defined as a rate of change greater than a predetermined minimum rate of change; identifying a second increase in current flow from the measured first current flow, the identified second increase greater than a predetermined minimum amount; confirming that the identified second increase in current flow is maintained for at least a predetermined amount of time beginning with the identified first increase in current flow; and outputting an error signal to the power sourcing equipment in the event of the identified rapid increase in current flow, the identified second increase in current flow and the confirmation that the identified second increase in current flow is maintained for at least the predetermined amount of time.

In one further embodiment, the power sourcing equipment is arranged to shut down responsive to the output error signal. In another further embodiment, the power sourcing equipment is provided with a first current limit and second current limit lower than the first current limit, wherein responsive to the output error signal the power sourcing equipment is arranged to change the current limit from the first current limit to the second current limit.

In one further embodiment, the method further comprises providing a distribution point power supply coupled to receive power from the power sourcing equipment, the distribution point power supply arranged to have a predetermined bandwidth such that a change in current drawn by the distribution point power supply over time is less than the predetermined rate of change. Optionally, the power sourcing equipment is arranged to detect a predetermined signature resistance presented by the distribution point power supply, the method further comprising: preventing the appearance of a parallel resistance from a POTS adapter from appearing to the power sourcing equipment in parallel to the predetermined signature resistance until a voltage in excess of a predetermined minimum value is detected by the UVLO circuit.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. The term 'resistor' as used herein is meant to include, without limitation, any suitable element providing electrical resistance. The term 'inductor' as used herein is meant to include, without limitation, any suitable element providing electrical inductance. The term 'capacitor' as used herein is meant to include, without limitation, any suitable element providing electrical capacitance. In the accompanying drawings.

DETAILED DESCRIPTION OF THE PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

As indicated above, it is presently contemplated by the inventors that PSE 70 should provide for detection of DC extraction circuitry 60 prior to supplying power, in a manner somewhat similar to the detection operation of Power over Ethernet (POE). In POE, a load signature is a passive resistor, as described inter-alia in IEEE 802.3 af—2003, the entire contents of which is incorporated herein by reference. In POE a PSE is connected to power a single PD, however when adapting POE to handle RPF, and simultaneously provide power to POTS adapters, such as POTSA-D adapter 100, PSE 70 may thus see multiple loads, i.e. the DC extraction circuitry 60 of DPU 20 and one or more POTSA-D adapter 100 connected in parallel. In such a condition PSE 70 will be unable to properly detect and power DPU 20 or the POTSA-D adapter 100.

Figure 2:
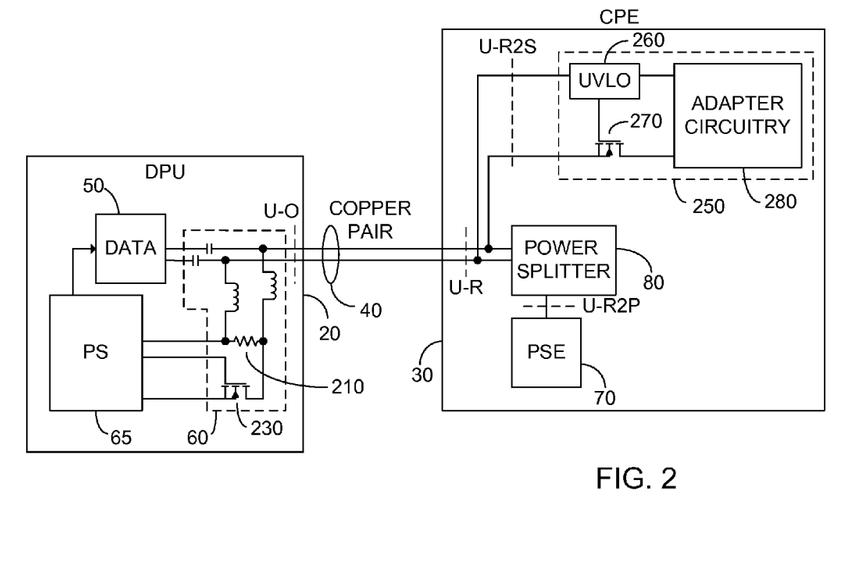
FIG. 2 illustrates a high level block diagram of a detection arrangement for the reverse power feeding arrangement of FIG. 1 according to certain embodiments.

FIG. 2 illustrates a high level block diagram of a detection arrangement for the reverse power feeding arrangement of FIG. 1 according to certain embodiments. DC extraction circuitry 60 of DPU 20 comprises a pair of inductors to provide a high impedance path for data towards power supply 65, while providing a low impedance path for the flow of DC power from copper pair 40, shown as a pair of conductors. Capacitors are provided to isolate data provision module 50 from any DC power provided over copper pair 40. Sense resistor 210 is shown effectively connected across copper pair 40, arranged to provide a predetermined resistance for detection by PSE 70. Isolating switch 230 is provided so as to connect power supply 65 to PSE 70 over copper pair 40 responsive to detection of operating power by power supply 65, which may be arranged to detect an operating voltage level with a under voltage lockout circuit coupled towards PSE 70. Sense resistor 210 is illustrated as a directly connected resistor for simplicity, it being understood by those skilled in the art that a switched resistance may be utilized so as to avoid the power loss from having a fixed resistance lying across the power path. Sense resistor 210 is shown as a single resistor, however a pair of serially connected resistors may be utilized, with a common potential being established at the nexus between the two serially connected sense resistors.

POTSA-D adapter 250 comprises under voltage lockout circuit (UVLO) 260, electronically controlled switch 270 responsive to UVLO 260, and adapter circuitry 280. Adapter circuitry 280 may be identical with POTSA-D 100 describe above.

In operation, PSE 70 attempts to detect sense resistor 210 over copper pairs 40. UVLO 260 maintains electronically controlled switch 270 in an open condition as long as detection type voltages (typically under 10 Volts DC) are detected across copper pair 40. Thus, the input impedance of adapter circuitry 280 is isolated from PSE 70 during the detection process. Upon detection of an operating voltage, such as a voltage in excess of 36V DC across copper pair 40, UVLO 260 closes electronically controlled switch 270 thus enabling operation of adapter circuitry 280 utilizing power from PSE 70.

As indicated above, under normal conditions, POTS adapters protect the attached telephone from overload and damage using the internal current limiter of the POTS adapter. The problem occurs in an abnormal situation when POTS phone 110 is connected to in premises wiring without a POTS adapter, i.e. in the event that POTS phone 110 is connected at an equivalent to the U-R reference point. If POTS phone 110 is on-hook, no current is drawn, and thus no difficulty is experienced. However, when POTS phone 110 goes off-hook, POTS phone 110 consumes significant current and can be damaged or cause a fire due to the large current flow. Therefore it is required to disconnect power, or reduce power drawn to a predetermined lower current limit, when a directly connected POTS phone, connected without an adapter, goes off-hook. Any such solution should not interfere with normal load transient off DPU 20 which can have similar behavior, particularly when DPU 20 is powered by a number of CPEs, and some of the CPEs are disconnected simultaneously.

To solve this problem a number of phones were tested by the inventors when going from on-hook to off-hook, when connected to a PSE, and the results are presented below in Table 1:

TABLE 1

| Phones | Initial current rise | Initial peak | Steady State | Shut down in |
|---|---|---|---|---|
| ATT210 | 5 μs | 390 mA | 200 mA | 2 s |
| NB-10 | 30 μs | 370 mA | 400 mA | 65 ms |
| SAKAR | 5 μs | 350 mA | 250 mA | 3 s |
| ACL-511 | 12 μs | 1.2 A | 400 mA | 3 ms |
| C4A | 6 μs | 520 mA | 400 mA | 70 ms |
| GP22 | 12 μs | 800 mA | 400 mA | 65 ms |
| TG2420 | 10 μs | 440 mA | 240 mA | Note 1 |
| V 5853 | 12 μs | 400 mA | 360 mA | 250 ms |
| CL82301 | 10 μs | 250 mA | Note 2 | 5 s |

From Table 1 it is apparent that an off hook phone has very fast current rise time, and the current rises to a significant current value.

Figure 3:
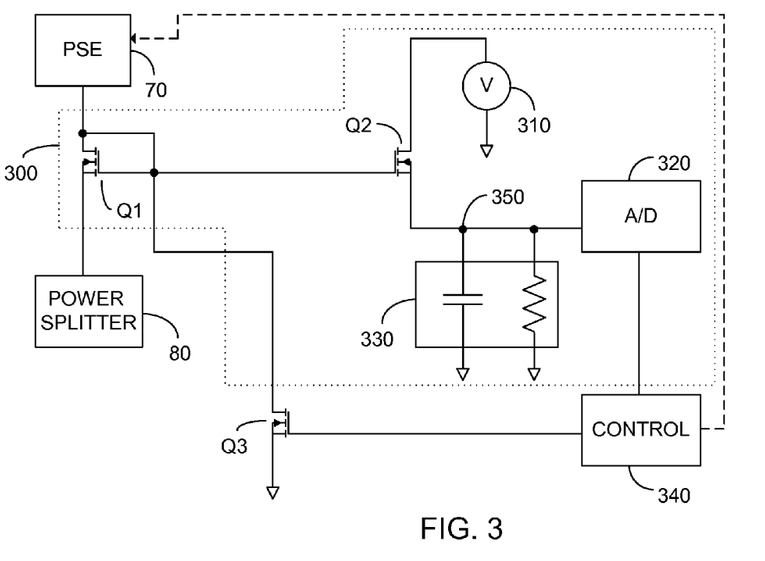
FIG. 3 illustrates a high level circuit diagram of a first current sense circuit and power sourcing equipment control arrangement according to circuit embodiments.

FIG. 3 illustrates a high level circuit diagram of a current sense circuit 300 according to circuit embodiments, the current sense circuit coupled between PSE 70 and power splitter 80. Current sense circuit 300 is arranged to provide an indication of the amount of current provided from PSE 70, illustrated as implemented by a current minor circuit placed between PSE 70 and power splitter 80, however this is not meant to be limiting in any way. The output of current sense circuit 300 is provided to a control circuit 340, which is arranged to determine the existence of an incorrectly connected POTS phone 110 going off-hook, and is further arranged to either short out the output of PSE 70 via an electronically controlled switch Q3, illustrated without limitation as a MOSFET Q3, or to provide a signal to PSE 70 to either shut down, or reduce the current limit of PSE 70.

Current sense circuit 300 comprises: a first transistor Q1, illustrated without limitation as a MOSFET Q1; a second transistor Q2, illustrated without limitation as a MOSFET Q2; a voltage source 310; a low pass filter 330 illustrated as comprising a capacitor and resistor in parallel with each other; and an analog to digital converter (A/D) 320. A voltage node 350 is illustrated as an aid in understanding.

The drain and gate of MOSFET Q1 are connected to the positive output of PSE 70 and the source of MOSFET Q1 is connected to the input of power splitter 80. As indicated above in relation to FIGS. 1, 2, the output of power splitter 80 is provided to DPU 20 and to one or more POTS adapters. The gate of MOSFET Q1 is further connected to the gate of MOSFET Q2, and to the drain of MOSFET Q3. The source of MOSFET Q3 is connected to a common potential. The drain of MOSFET Q2 is connected to the positive output of voltage source 310, and the return of voltage source 310 is connected to the common potential. The source of MOSFET Q2 is connected to a first end of each of the resistor and capacitor in low pass filter 330, and to the input of A/D converter 320. The second end of each of the capacitor and resistor of low pass filter 330 are connected to the common potential. The output of A/D converter 320 is connected to the input of control circuit 340. The output of control circuit 340 is in one embodiment connected to the gate of MOSFET Q3. In an alternative embodiment, shown by the broken line, the output of control circuit 340 is connected to a control input of PSE 70.

In operation, and as will be described further below in relation to FIG. 4, control circuit 340 detects a POTS phone 110, improperly connected across PSE 70, proceeding to an off-hook condition, responsive to changes in the detected current output by current sense circuit 300. The current flowing through MOSFET Q2, or a portion thereof, is mirrored through MOSFET Q3, and filtered by low pass filter 330. The filtered mirrored current is digitized by A/D converter 320 and presented to control circuit 340. Control circuit 340 is arranged to output a signal which effectively shuts down PSE 70, or reduces the current limit of PSE 70 to safe levels. In the embodiment in which MOSFET Q3 is utilized, an active signal sent to the gate of MOSFET Q3 turns on MOSFET Q3 thus bypassing power splitter 80 and effectively providing a short circuit across PSE 70, which may act as a crowbar protection. In alternative arrangement shown, PSE 70 is disabled responsive to the output signal from control circuit 340, or reduce the current limit of power provided by PSE 70 to safe levels. Control circuit 340 may be implemented by a state machine, micro-controller or dedicated circuitry without exceeding the scope.

Figure 4:
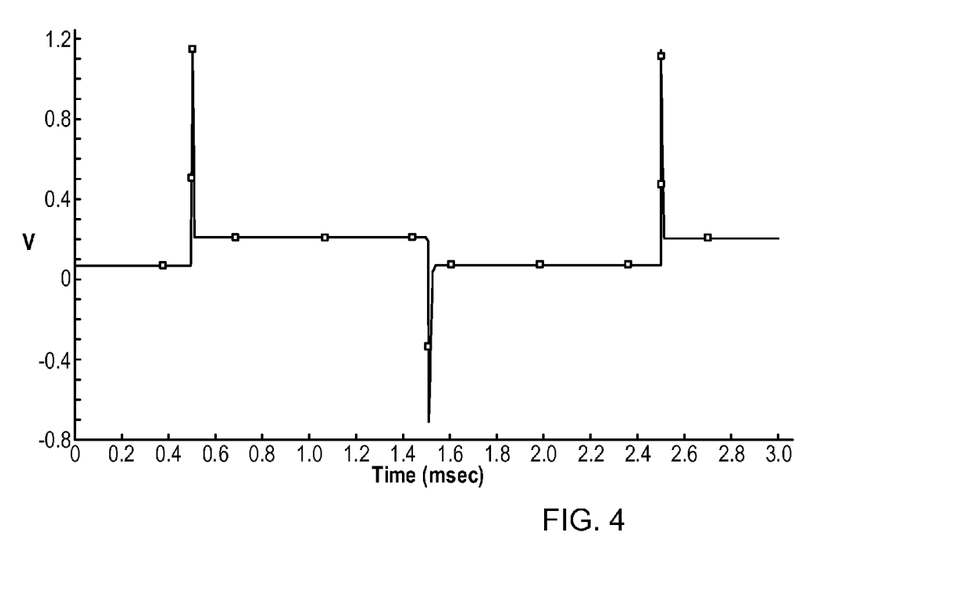
FIG. 4 shows a simulation of the voltage at node of FIG. 3 over time responsive to an off-hook condition with a load current of 280 mA and a rise time of 5 μsec.
Figure 5:
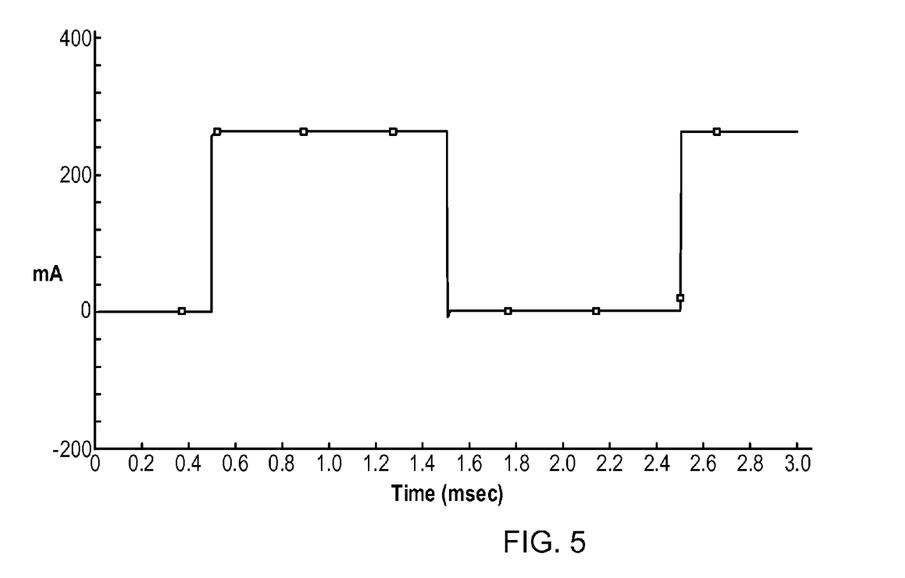
FIG. 5 shows a simulation of the current flow into a filter capacitor for the simulation of FIG. 4.

FIG. 4 shows a simulation of the voltage at node 350 over time responsive to an off-hook condition occurring at time 0.5 msec, wherein the x-axis shows time and the y-axis indicates voltage at node 350, for a condition of load current, i.e. POTS phone load, of I=280 mA with a rise time=5 μsec, using a simulated POTS phone 110. At time 1.5 msec an on-hook condition occurs, and again at time 2.5 msec an off-hook condition occurs, and again at time 2.5 msec an off-hook condition occurs. FIG. 5 shows current flow into, and out of, the capacitor of low pass filter 350 with the same time scale as in FIG. 4, with the y-axis indicating current. As can be seen, a voltage spike at node 350 is 1.2V for a POTS telephone having with a 280 mA current rise of 5 μsec.

Figure 6:
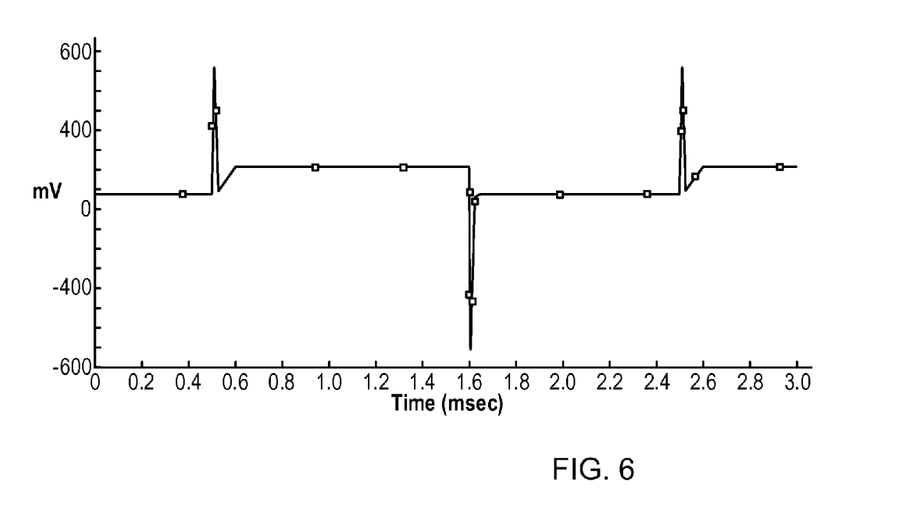
FIG. 6 shows a simulation of the voltage at a node of FIG. 3 over time responsive to an off-hook condition with a load current of 280 mA and a rise time of 100 μsec.
Figure 7:
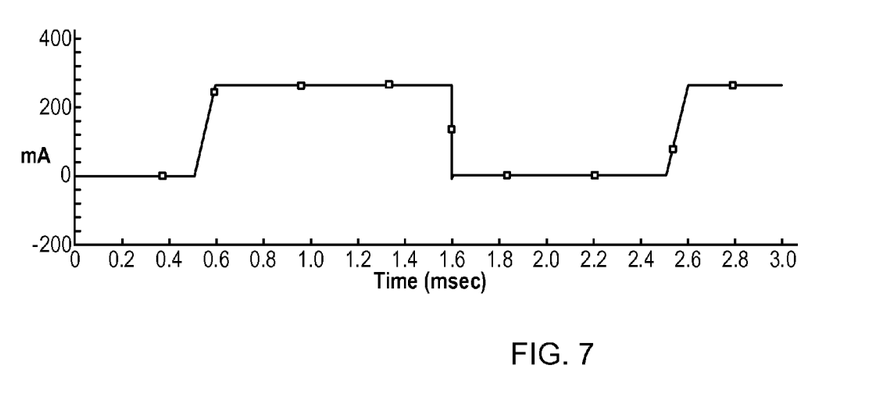
FIG. 7 shows a simulation of the current flow into a filter capacitor for the simulation of FIG. 6.

FIG. 6 shows a simulation of the voltage at node 350 over time responsive to an off-hook condition occurring at time 0.5 msec, wherein the x-axis shows time and the y-axis indicated voltage at node 350, for a condition of load current, i.e. POTS phone load, of I=280 mA with a rise time=100 μsec, using a simulated POTS phone 110. At time 1.6 msec an on-hook condition occurs, and again at time 2.5 msec an off-hook condition occurs. FIG. 7 shows current flow into, and out of, the capacitor of low pass filter 350 with the same time scale as in FIG. 6. As can be seen, a voltage spike at node 350 is 0.7V for a POTS telephone having with a 280 mA current rise of 100 μsec.

Figure 8:
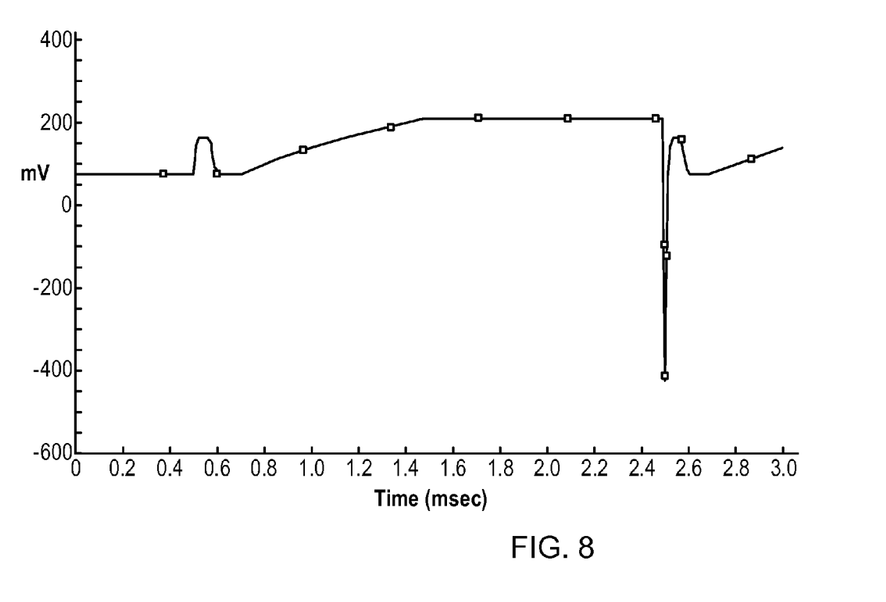
FIG. 8 shows a simulation of the voltage at a node of FIG. 3 over time responsive to an off-hook condition with a load current of 280 mA and a rise time of 1 sec.

FIG. 8 shows a graph of voltage at node 350 for a condition of load current I=280 mA, current rise 1 msec. As can be seen, the spike is not clearly detectable, as the voltage rise is more akin to changes in the load DPU 20 than a POTS phone 110 going off hook. One of the important issues that must be taken into account by control circuit 340 in making a determination is that a DPU 20 during load transient may behave as an improperly connected POTS phone going off-hook.

Figure 9:
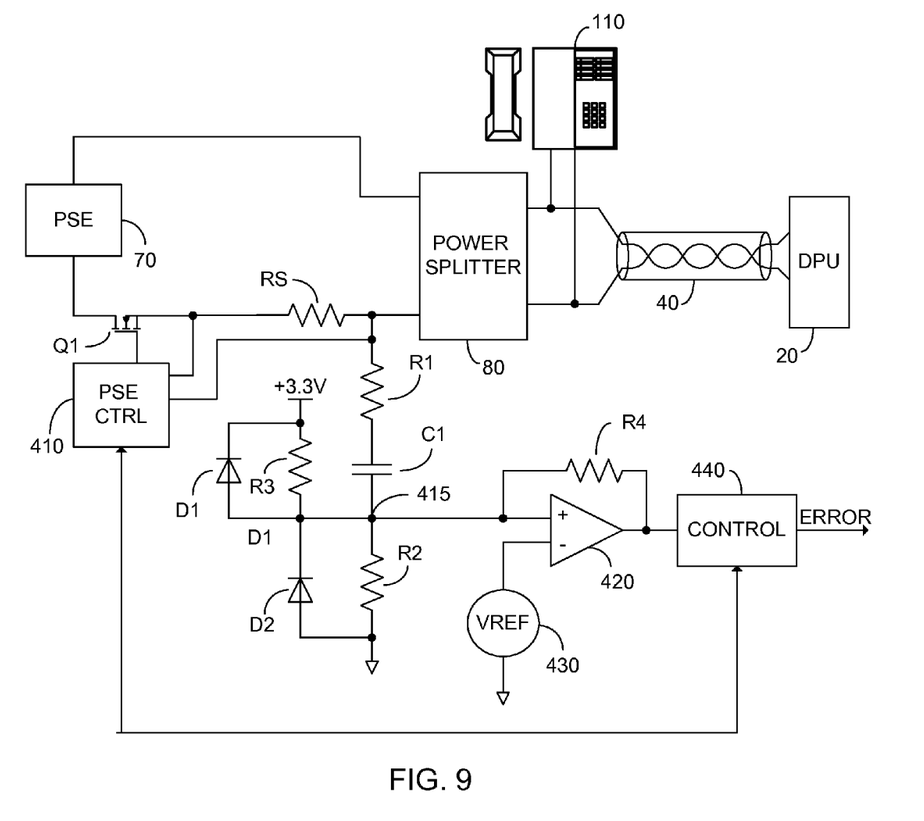
FIG. 9 illustrates a high level circuit diagram of a second current sense circuit and power sourcing equipment control arrangement according to circuit embodiments.

FIG. 9 illustrates a high level circuit diagram of a second current sense circuit and power sourcing equipment control arrangement according to circuit embodiments, illustrated with an improperly connected POTS telephone 110. In particular, the arrangement of FIG. 9 comprises: PSE 70; a PSE controller 410; electronically controlled switch Q1, illustrated without limitation as an NMOSFET; power splitter 80; copper pair 40, shown particularly as a twisted pair in a cable; DPU 20; a control circuit 440; a current sense resistor RS; a voltage source, illustrated without limitation as a 3.3V source; a voltage reference 430; an operational amplifier 420; a plurality of resistors R1, R2, R3 and R4; a plurality of diodes D1 and D2; and a capacitor C1. Control circuit 440 may be implemented in a micro-controller. Control circuit 440, while shown as a particular block receiving a digital signal from the output of op-amp 420, may be considered as incorporating the spike detection circuitry of R1, R2, R3, R4, C1, D1, D2 and op-amp 420.

A positive output of PSE 70 is connected to a first input of power splitter 80 and a return of PSE 70 is connected to the drain of Q1. The gate of Q1 is connected to an output of PSE controller 410, the source of Q1 is connected to a first end of current sense resistor RS and to a first input of PSE controller 410 and the second end of current sense resistor RS is connected to a first end of resistor R1, to a second input of PSE controller 410 and to a second input of power splitter 80. The outputs of power splitter 80 are connected via copper pair 40 to DPU 20. POTS telephone 110 is shown improperly connected across copper 40, i.e. without the required POTSA-D adapter 100 as described above in relation to FIG. 1. A second end of resistor R1 is connected to a first end of capacitor C1, and a second end of capacitor C1 is connected to a node 415. Node 415 is connected via resistor R2 to a common potential, such as ground; to the cathode of diode D2, whose anode is connected to the common potential; via resistor R3 to the 3.3 V source; to the anode of diode D1, whose cathode is connected to the 3.3 V source; to a first end of resistor R4; and to the non-inverting input of op-amp 420. The positive output of voltage reference 430 is connected to the inverting input of op-amp 420 and the return of voltage reference 430 is connected to the common potential. The output of op-amp 420 is connected to the input of control circuit 440 and to a second end of resistor R4. Control circuit 440 is in bidirectional communication with PSE controller 410, and further exhibits an operator output, denoted ERROR. A bidirectional communication path between control circuit 440 and PSE controller 410 is illustrated, such as an I²C bus, however this is not meant to be limiting in any way, and a pair of independent communication paths may be provided without exceeding the scope.

In operation, PSE controller 410 controls Q1 responsive to the voltage developed across current sense resistor RS so as to limit the current flow there through to a first predetermined limit so as to provide controlled power to DPU 20. Information regarding the current flow amount is further communicated to control circuit 440. Power is supplied to DPU 20 from PSE 70 via power splitter 80 and copper pair 40 responsive to the operation of PSE controller 410.

R1 provides isolation between capacitor C1 and current sense resistor RS. Capacitor C1 functions as a differentiator, passing any short term current changes, while blocking any DC flow. The values of R1 and C1 are selected to identify a rate of change greater than a predetermined minimum rate of change associated with a spike from off-hook condition, which predetermined minimum rate of change is represented by the value of voltage reference 430. Resistor D2 and D3 function as a voltage divider to set the DC operating point for the non-inverting input of op-amp 420, and diodes D1 and D2 function as protection diodes to prevent the voltage at node 415 from rising above about 4V and below about −0.7V. Op-amp 420, with resistor R4 set to provide positive feedback, is arranged as a comparator, which will provide a high output when the voltage at node 415 exceeds voltage reference 430, and a low output otherwise.

In the event that POTS telephone 110 is improperly connected, as shown, and goes off hook, a current spike having a dI/dt, i.e. a rate of change greater than the predetermined minimum rate of change, will be experienced across current sense resistor RS. The current spike will appear at node 415, and as described above will be greater than the voltage of voltage reference 430, and thus will set the output of op-amp 420 to high, which is input to control circuit 440. The amount of current passing through current sense resistor RS, read by PSE controller 410 is further communicated to control circuit 440. Control circuit 440 is thus operative to identify a current spike greater than a predetermined minimum spike value, i.e. a rate of change of the current detected by current sense resistor RS greater than a predetermined rate of change, by virtue of the high value input from op-amp 420. Control circuit 440 is further arranged, as will be described further below, to determine if the increase in current flow amount, communicated thereto by PSE controller 410, exceeds a predetermined minimum amount, and further identify if the current increase is maintained for a predetermined minimum amount of time, indicative of a confirmed off-hook condition for an improperly connected POTS telephone 110. Responsive to such an identified condition, control circuit 440 is arranged to signal PSE controller 410 to stop the flow of current from PSE 70 by opening switch Q1, or alternatively reduce the current limit presented by Q1, and further operative to output a signal to an operator indicative of the error condition caused by the improperly connected POTS telephone 110. Such an output is advantageous so that the operator will be able to identify the cause of the shutdown of PSE 70.

Figure 10:
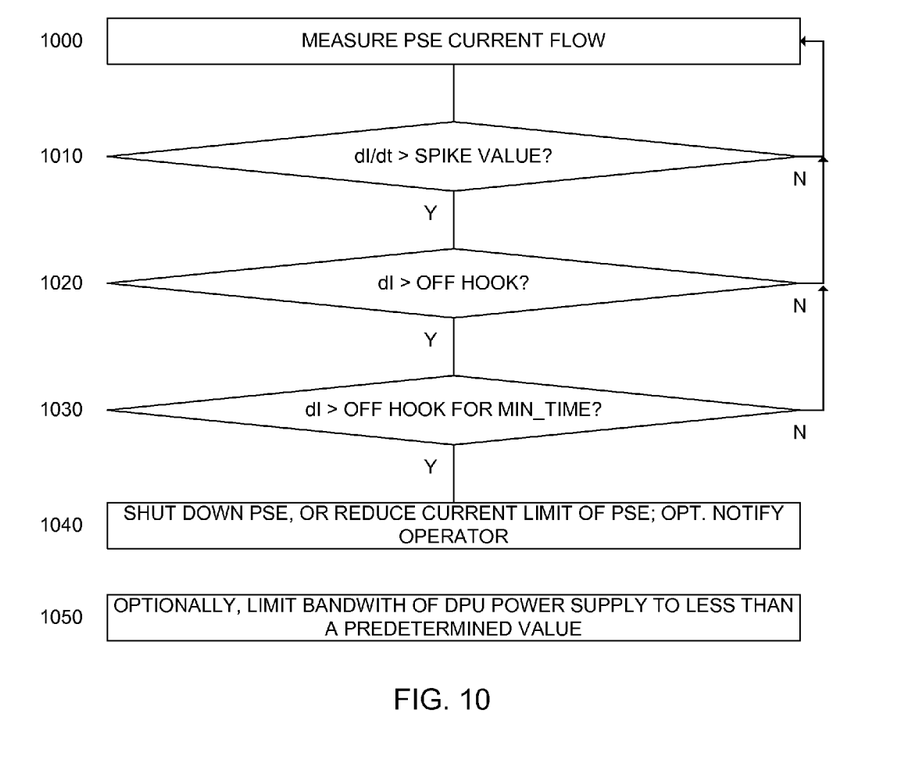
FIG. 10 illustrates a high level flow chart of the operation of the control circuit of FIGS. 3, 10 to identify an off-hook condition of an improperly connected POTS telephone according to certain embodiments.

FIG. 10 illustrates a high level flow chart of the operation of control circuit 340 of FIG. 3, or control circuit 440 of FIG. 9, to identify an off-hook condition of an improperly connected POTS telephone according to certain embodiments. In stage 1000 control circuit 340 measures the current flow of PSE 70, and sets that as a first current flow, i.e. as a baseline. In stage 1010, the rate of change of the monitored current from the baseline current of stage 1000 is compared to a predetermined SPIKE VALUE, i.e. a rate of change associated with a spike. In one non-limiting embodiment, SPIKE VALUE is 10 mA/μsec. As described above the rate of change is in one embodiment identified by an A/D converter with a control circuit monitoring the rate of change of the current, and in another embodiment a differentiator and comparator, pre-set to identify a spike of the appropriate rate of change are provided.

In the event that in stage 1010 the rate of current change exceeds SPIKE VALUE, in stage 1020 the change of current from the baseline value of stage 1000 is compared with a second value, illustrated as an OFF HOOK value. In one non-limiting embodiment, OFF HOOK is 280 mA. In the event that in stage 1020 the change of current is greater than OFF HOOK, in stage 1030 a timer is set and the change in current greater than OFF HOOK is confirmed as being maintained for at least MIN_TIME. In one non-limiting embodiment MIN_TIME is 30 msec.

In the event that in stage 1030 the change in current greater than OFF HOOK is maintained for MIN_TIME, in stage 1040 a signal is output to either shut down PSE 70, or reduce the current limit to a safe value in light of the detected improperly connected POTS phone 110. Optionally, an additional signal is output to an operator indicative of the error condition for which the PSE 70 has been shut down.

In the event that in stage 1010 the rate of current change does not exceed SPIKE VALUE; or that in stage 1020 the change of current is not greater than OFF HOOK; or that in stage 1030 the change in current greater than OFF HOOK is not confirmed as being maintained for at least MIN_TIME, stage 1000 is repeated, thus updating the baseline current value.

Power supply response time to a step load change is proportional to the reciprocal of the feedback loop bandwidth and the amount of ringing is related to the phase margin Φm. Phase margin of 72° gives no ringing or overshoot.

Time to PS response for PS 70 of DPU 20 is:

$$t = 1/(4 * Bw * \cos(\phi m)) \qquad \text{EQ. 1}$$

where Bw is defined as the bandwidth and "φm" is phase margin. Setting φm at 72° results in a cos(72°)=0.309.

To be sure that the feedback response of PS 70 will be much slower than an off-hook telephone response, PS 70 is preferably restricted to predetermined maximum bandwidth, as shown in stage 1050.

In some detail, assuming we would like to have PS 70 to have a response of 1 msec, thus in accordance with EQ. 1, Bw is to be less than 3.236 KHz. In such a case, irrespective of change in load at DPU 20, the rise time of PS 70 will be as shown in FIG. 8, and thus will not be detected by control circuit 340.

In summary, one difficulty with detection of an off-hook condition from an improperly connected POTS phone 110, is that PS 70 in DPU 20 may also show rapid changes in current draw. Looking at a worst case scenario, assuming 8 CPEs are connected to DPU 20, and 7 CPEs are now disconnected. The remaining CPE will experience an increased current draw, which must be differentiated from the above failure condition.

Thus, as indicated above we identify an off-hook of an improperly connected POTS phone as a current spike followed by an increased current draw. Preferably, we further limit the transient response of PS 70 of DPU 20 so changes in current draw from PS 70 are gradual, and are thus not confused with the failure condition. To accomplish same, we preferably set the bandwidth of PS 70 to less than 3.2 KHz, or based on the calculations above 3.236 KHz.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A powering arrangement for use with reverse power feeding, the powering arrangement comprising:
    a control circuit;
    a power sourcing equipment, said power sourcing equipment responsive to said control circuit; and
    a current sensing circuit arranged to detect the amount of current provided by the power sourcing equipment, said control circuit in communication with said current sensing circuit,
    said control circuit arranged to:
        measure a first current flow from the power sourcing equipment;
        identify a rapid first increase in current flow from the measured first current flow, the rapid increase defined as a rate of change greater than a predetermined minimum rate of change;
        identify a second increase in current flow from the measured first current flow, the identified second increase greater than a predetermined minimum amount;
        confirm that said identified second increase in current flow is maintained for at least a predetermined amount of time beginning with said identified first increase in current flow; and
        output an error signal to the power sourcing equipment responsive to said identified rapid increase in current flow, said identified second increase in current flow and said confirmation that said identified second increase in current flow is maintained for at least the predetermined amount of time.

2. The powering arrangement according to claim 1, wherein said power sourcing equipment is disabled responsive to said output error signal.

3. The powering arrangement according to claim 1, wherein said power sourcing equipment is provided with a first current limit and second current limit lower than said first current limit, wherein responsive to said output error signal said power sourcing equipment is arranged to change the current limit from the first current limit to the second current limit.

4. The powering arrangement according to claim 1, wherein said current sensing circuit comprises a current mirror.

5. The powering arrangement according to claim 1, further comprising:
    a DC extraction circuitry; and
    a distribution point power supply,
    said DC extraction circuitry coupled over a copper wire pair to the power sourcing equipment,
    said DC extraction circuitry arranged to feed an extracted power to said distribution point power supply,
    said distribution point power supply having a predetermined bandwidth such that a change in current drawn by the distribution point power supply over time is less than said predetermined minimum rate of change.

6. The powering arrangement according to claim 1, wherein said power sourcing equipment is arranged to detect a predetermined signature resistance presented by said DC extraction circuitry, the power arrangement further comprising:
    a plain old telephony service (POTS) adapter coupled to the power sourcing equipment, said POTS adapter comprising an under voltage lockout (UVLO) circuit and an electronically controlled switch responsive to the output of said UVLO circuit, said electronically controlled switch arranged to prevent the appearance of a parallel resistance from said POTS adapter from appearing to the power sourcing equipment in parallel to the predetermined signature resistance until a voltage in excess of a predetermined minimum value is detected by said UVLO circuit.

7. A method of powering for use with reverse power feeding, the method comprising:
    measuring a first current flow from a power sourcing equipment;
    identifying a rapid first increase in current flow from the measured first current flow, the rapid increase defined as a rate of change greater than a predetermined minimum rate of change;
    identifying a second increase in current flow from the measured first current flow, the identified second increase greater than a predetermined minimum amount;
    confirming that said identified second increase in current flow is maintained for at least a predetermined amount of time beginning with said identified first increase in current flow; and
    outputting an error signal to the power sourcing equipment in the event of said identified rapid increase in current flow, said identified second increase in current flow and said confirmation that said identified second increase in current flow is maintained for at least the predetermined amount of time.

8. The method according to claim 7, further comprising:
    disabling said power sourcing equipment responsive to said output error signal.

9. The method according to claim 7, wherein said power sourcing equipment is provided with a first current limit for a power provided for the reverse power feeding and second current limit lower than said first current limit, wherein the method further comprises, responsive to said output error signal, changing the current limit from the first current limit to the second current limit.

10. The method according to claim 7, further comprising providing a distribution point power supply coupled to receive power from said power sourcing equipment, said distribution point power supply arranged to have a predetermined bandwidth such that a change in current drawn by the distribution point power supply over time is less than said predetermined rate of change.

11. The method according to claim 10, further comprising:
said power sourcing equipment detecting a predetermined signature resistance presented by said distribution point power supply; and
preventing the appearance of a parallel resistance from a POTS adapter from appearing to the power sourcing equipment in parallel to the predetermined signature resistance until a voltage in excess of a predetermined minimum value is detected by said UVLO circuit.

* * * * *